R. A. B. WALSH.
METHOD AND APPARATUS FOR MAKING WIRE GLASS.
APPLICATION FILED DEC. 2, 1907.
940,845.
Patented Nov. 23, 1909.
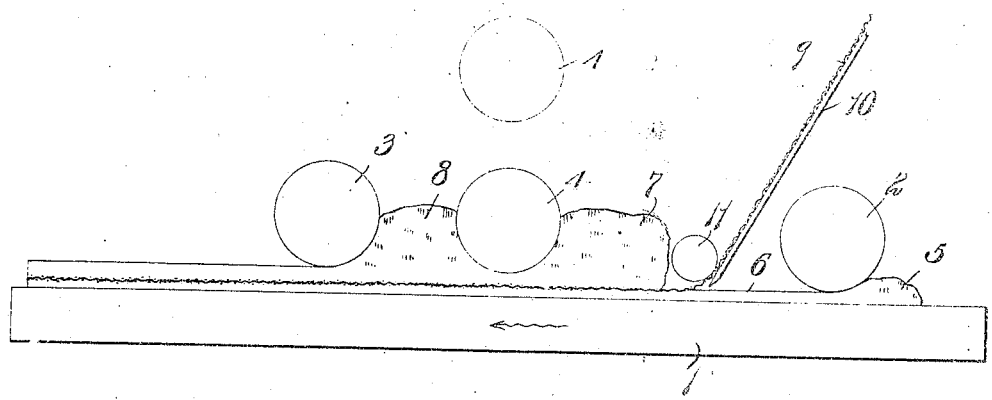
Witnesses:
Geo. R. Cadson
Wells L. Church
Inventor,
Robert A. B. Walsh.
By Bakewell & Cornwall Attys

UNITED STATES PATENT OFFICE.

ROBERT A. B. WALSH, OF ST. LOUIS, MISSOURI.

METHOD AND APPARATUS FOR MAKING WIRE-GLASS.

940,845.

Specification of Letters Patent.   Patented Nov. 23, 1909.

Application filed December 2, 1907.   Serial No. 404,853

*To all whom it may concern:*

Be it known that I, ROBERT A. B. WALSH, a citizen of the United States, residing at St. Louis, Missouri, have invented a certain new and useful Improvement in Methods and Apparatus for Making Wire-Glass, of which the following is a full, clear, and exact description, such as will enable others skilled in the art to which it appertains to make and use the same, reference being had to the accompanying drawings, forming part of this specification, in which—

The figure is a side elevation of an apparatus for practicing my method.

This invention relates to the manufacture of wire glass.

The object of my invention is to provide a novel method of making wire glass and also an apparatus for practicing my method.

Briefly described, my method consists in forming a sheet of wire glass from three separate layers of glass, a piece of wire mesh being arranged between two of said layers. Preferably, the first layer or bottom layer is formed from one mass of molten glass and the second and third layers are formed from a separate mass of glass which is divided into two portions by the roller that forms the second layer.

Referring to the drawings which illustrate one form of apparatus for carrying out my method, 1 designates a casting table, and 2 a smooth-surface roller arranged above the casting table at a distance therefrom equal to the thickness of the bottom layer. A smooth-surface roller 3 is arranged above the table a distance equal to the thickness of the finished product, and an adjustable roller 4 is located intermediate the rollers 2 and 3.

To form a sheet of wire glass with an apparatus of this description I first dump a mass of molten glass 5 onto the table adjacent the roller 2 and then move the table longitudinally in the direction of the arrow so that said mass will be formed into a bottom layer 6. When the end of the bottom layer 6 has arrived at a point adjacent the roller 3 a large batch of molten glass is dumped onto said bottom layer and the roller 4 is then moved downwardly into the position shown in full lines so that it will divide said large batch of glass into two portions 7 and 8, a piece of wire mesh 9 having been placed on the bottom layer prior to the operation of dumping said batch of glass onto said layer. As the table continues to travel in the direction of the arrow, the roller 4 will spread the mass of glass 7 over the bottom layer to form a second or intermediate layer which covers the wire mesh and the roller 3 will form the mass of glass 8 into a top layer or finishing coating for the second layer. As the wire mesh is completely covered as soon as it becomes heated from contact with the molten glass, said mesh will not oxidize and therefore will look bright and new after it has been embedded in the glass. The wire mesh has a tendency to contract and draw the glass in which it is embedded and this produces an irregular or uneven surface on the second layer but this uneven surface is covered by the third layer or finishing layer so that the finished product has smooth and brilliant surfaces.

I have herein shown the wire mesh as being guided into position by a chute 10 and guide roll 11 but it will, of course, be understood that the wire mesh can be introduced in various ways without departing from the spirit of my invention. If desired, the wire mesh can be inserted underneath the roller 2 prior to the operation of dumping the mass of glass 5 onto the table so that the wire mesh will be forced into the bottom layer simultaneously with the operation of forming said layer.

Having thus described my invention, what I claim as new and desire to secure by Letters Patent is:

1. The method of making wire glass, which consists in forming a layer of glass, dumping a batch of molten glass onto said layer, dividing into two portions and rolling them into separate superimposed layers, and arranging a wire mesh between two of the layers; substantially as described.

2. The method of making wire glass, which consists in forming a bottom layer of glass, dumping a batch of molten glass onto one end of said layer, separating said batch into a plurality of portions and forming said portions into independent layers, and embedding a wire mesh in one of said layers simultaneously with the operation of forming same; substantially as described.

3. The method of making wire glass, which consists in rolling a mass of molten glass into a bottom layer, dumping a batch of molten glass onto one end of said layer before it has been completed, dividing said batch into two portions and rolling them into separate superimposed layers, and simultaneously arranging a wire mesh between the bottom layer and the second layer; substantially as described.

4. An apparatus for making wire glass, comprising means for forming a layer of glass, and means for dividing a batch of molten glass which has been dumped onto said layer into a number of portions and forming them into separate layers; substantially as described.

5. An apparatus for making wire glass, comprising means for forming a bottom layer of glass, and means for dividing a batch of molten glass into a plurality of portions and forming them into superimposed layers which are combined with the bottom layer, said means also operating to arrange a wire mesh between the bottom layer and the layer which covers same; substantially as described.

6. An apparatus for making wire glass, comprising a casting table, and a plurality of rollers arranged above the table at different distances therefrom so as to form a bottom layer, a top layer and a finishing coating for said top layer; substantially as described.

7. An apparatus for making wire glass, comprising a casting table, a roller arranged above the table for forming a bottom layer, a second roller arranged above the table a distance equal to the thickness of the finished product, and an adjustable roller located between the first and second rollers for dividing a batch of molten glass and spreading a portion thereof over the bottom layer; substantially as described.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.